US009953545B2

United States Patent
Matahira et al.

(10) Patent No.: US 9,953,545 B2
(45) Date of Patent: Apr. 24, 2018

(54) MUSICAL-PERFORMANCE-INFORMATION TRANSMISSION METHOD AND MUSICAL-PERFORMANCE-INFORMATION TRANSMISSION SYSTEM

(71) Applicant: YAMAHA CORPORATION, Hamamatsu-shi, Shizuoka (JP)

(72) Inventors: Kenji Matahira, Iwata (JP); Haruki Uehara, Hamamatsu (JP); Akira Maezawa, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/039,466

(22) PCT Filed: Jan. 6, 2015

(86) PCT No.: PCT/JP2015/050115
§ 371 (c)(1),
(2) Date: May 26, 2016

(87) PCT Pub. No.: WO2015/105091
PCT Pub. Date: Jul. 16, 2015

(65) Prior Publication Data
US 2016/0379514 A1 Dec. 29, 2016

(30) Foreign Application Priority Data

Jan. 10, 2014 (JP) .................................. 2014-003695

(51) Int. Cl.
*G10H 1/36* (2006.01)
*G09B 15/00* (2006.01)
(Continued)

(52) U.S. Cl.
CPC ............... *G09B 15/00* (2013.01); *G10F 1/02* (2013.01); *G10H 1/0058* (2013.01);
(Continued)

(58) Field of Classification Search
CPC ........... G10H 1/0058; G10H 2240/175; G10H 1/365; G10H 2240/325; G10H 1/36; G10H 3/125
See application file for complete search history.

(56) References Cited

U.S. PATENT DOCUMENTS 5,140,637 A 8/1992 McCarthy
6,038,324 A 3/2000 Ambourn
(Continued)

FOREIGN PATENT DOCUMENTS

JP 2001195058 A 7/2001
JP 2005084578 A 3/2005
(Continued)

OTHER PUBLICATIONS

International Search Report issued in Intl. Appln. No. PCT/JP2015/050115 dated Mar. 31, 2015. English translation provided.
(Continued)

*Primary Examiner* — Marlon Fletcher
(74) *Attorney, Agent, or Firm* — Rossi, Kimms & McDowell LLP

(57) ABSTRACT

A musical-performance-information transmission method using a first instrument and a second instrument, wherein the first instrument produces sounds in accordance with a user's musical performance and generates musical-performance data in accordance with the produced sounds and the second instrument produces sounds by receiving the musical performance data via a communication means. In the musical-performance-information transmission method, a mixed-sound signal is generated in accordance with a mixture of sounds produced by the first instrument and sounds that are different from the sounds produced by the first instrument, a reference signal is generated in accordance with the sounds produced by the first instrument, and on the basis of the mixed-sound signal and the reference signal, the reference (Continued)

signal is removed from the mixed-sound signal, generating a separated signal, and sound is emitted on the basis of said separated signal.

17 Claims, 4 Drawing Sheets

(51) Int. Cl.
| | |
|---|---|
| *G10L 21/0272* | (2013.01) |
| *G10H 1/00* | (2006.01) |
| *G10F 1/02* | (2006.01) |
| *G10L 25/93* | (2013.01) |
| *G10F 1/00* | (2006.01) |
| *G10H 7/00* | (2006.01) |

(52) U.S. Cl.
CPC ............ *G10H 1/0066* (2013.01); *G10H 1/365* (2013.01); *G10L 21/0272* (2013.01); *G10L 25/93* (2013.01); *G10F 1/00* (2013.01); *G10H 7/00* (2013.01); *G10H 2230/011* (2013.01); *G10H 2240/295* (2013.01)

(56) References Cited

U.S. PATENT DOCUMENTS

| | | | |
|---|---|---|---|
| 6,148,086 | A | 11/2000 | Ciullo et al. |
| 6,690,799 | B1 | 2/2004 | Iwase et al. |
| 7,081,580 | B2 | 7/2006 | Brinkman et al. |
| 7,129,408 | B2 | 10/2006 | Uehara |
| 7,672,466 | B2 | 3/2010 | Yamada et al. |
| 7,986,796 | B2 | 7/2011 | Kim et al. |
| 8,138,409 | B2 | 3/2012 | Brennan |
| 8,295,494 | B2 | 10/2012 | Oh et al. |
| 8,346,311 | B2 | 1/2013 | Tachibana |
| 8,358,906 | B2 | 1/2013 | Takai et al. |
| 8,541,676 | B1 | 9/2013 | Waldman |
| 8,572,487 | B2 | 10/2013 | Rich |
| 8,957,297 | B2 | 2/2015 | Urry et al. |
| 9,071,900 | B2 | 6/2015 | Vesa et al. |
| 9,230,552 | B2 | 1/2016 | Soroka et al. |
| 9,372,251 | B2 | 6/2016 | Soulodre |
| 9,373,320 | B1 | 6/2016 | Lyon et al. |
| 9,524,707 | B2 | 12/2016 | Urry et al. |
| 2002/0120675 | A1 | 8/2002 | Everett et al. |
| 2003/0094091 | A1 | 5/2003 | Brinkman et al. |
| 2003/0094092 | A1 | 5/2003 | Brinkman et al. |
| 2003/0115349 | A1 | 6/2003 | Brinkman et al. |
| 2003/0164084 | A1* | 9/2003 | Redmann ............ G10H 1/0058 84/615 |
| 2004/0044804 | A1 | 3/2004 | MacFarlane |
| 2004/0044805 | A1 | 3/2004 | MacFarlane |
| 2004/0177744 | A1 | 9/2004 | Strasser et al. |
| 2005/0120866 | A1 | 6/2005 | Brinkman et al. |
| 2005/0150362 | A1* | 7/2005 | Uehara .................. G09B 15/00 84/645 |
| 2006/0112814 | A1 | 6/2006 | Paepcke |
| 2006/0182291 | A1 | 8/2006 | Kunieda et al. |
| 2007/0147623 | A1 | 6/2007 | Kim et al. |
| 2007/0147638 | A1 | 6/2007 | Moon |
| 2008/0049943 | A1 | 2/2008 | Faller et al. |
| 2008/0075292 | A1 | 3/2008 | Wong et al. |
| 2008/0163747 | A1* | 7/2008 | Uehara ................ G10H 1/0058 84/645 |
| 2008/0184870 | A1 | 8/2008 | Toivola |
| 2008/0245215 | A1* | 10/2008 | Kobayashi ............. G10H 1/383 84/661 |
| 2009/0038467 | A1* | 2/2009 | Brennan .................. G09B 5/00 84/609 |
| 2009/0038468 | A1 | 2/2009 | Brennan |
| 2009/0064851 | A1* | 3/2009 | Morris ................. G10H 1/0025 84/637 |
| 2009/0067634 | A1 | 3/2009 | Oh et al. |
| 2009/0178533 | A1 | 7/2009 | Koseki et al. |
| 2010/0089223 | A1 | 4/2010 | Ting |
| 2010/0299151 | A1 | 11/2010 | Soroka et al. |
| 2011/0146476 | A1* | 6/2011 | Zimmerman .......... G09B 15/00 84/470 R |
| 2012/0063617 | A1 | 3/2012 | Ramos |
| 2012/0253827 | A1 | 10/2012 | Soroka et al. |
| 2012/0300941 | A1 | 11/2012 | Shim et al. |
| 2013/0065213 | A1 | 3/2013 | Gao et al. |
| 2013/0294606 | A1 | 11/2013 | Soroka et al. |
| 2013/0327201 | A1 | 12/2013 | Urry et al. |
| 2015/0154948 | A1 | 6/2015 | Urry et al. |
| 2015/0278686 | A1 | 10/2015 | Cardinaux et al. |
| 2015/0302758 | A1* | 10/2015 | Tunogai .................... G10G 1/02 84/470 R |
| 2016/0139775 | A1 | 5/2016 | Segal |
| 2016/0329036 | A1 | 11/2016 | Uehara |
| 2016/0360019 | A1 | 12/2016 | Ellis |
| 2016/0379514 | A1* | 12/2016 | Matahira ................ G09B 15/00 84/470 R |

FOREIGN PATENT DOCUMENTS

| | | |
|---|---|---|
| JP | 2007256879 A | 10/2007 |
| JP | 2008172409 A | 7/2008 |
| JP | 2009168911 A | 7/2009 |
| RU | 2189119 C2 | 9/2002 |
| RU | 2007114585 A | 10/2008 |
| WO | 2005111997 A1 | 11/2005 |

OTHER PUBLICATIONS

Written Opinion issued in Intl. Appin. No. PCT/JP2015/050115 dated Mar. 31, 2015.
Office Action issued in U.S. Appl. No. 15/110,828 dated Jun. 15, 2017.
Extended European Search Report issued in European Appln. No. 15735419.2 dated Jun. 19, 2017.
International Search Report issued in International Application No. PCT/JP2015/050175 dated Mar. 31, 2015. English translation provided.
Written Opinion issued in International Application No. PCT/JP2015/050175 dated Mar. 31, 2015.
Office Action issued in U.S. Appl. No. 15/110,828 dated Dec. 23, 2016.
Notice of Allowance issued in U.S. Appl. No. 15/110,828 dated Apr. 11, 2017.
Notice of Allowance issued in U.S. Appl. No. 15/110,828 dated Oct. 6, 2017.
Office Action issued in Russian Application No. 2016127416 dated Sep. 19, 2017. English translation provided.
Office Action issued in Japanese Application No. 2014-003695 dated Oct. 31, 2017. English translation provided.
Office Action issued in Japanese Application No. 2014-004369 dated Jan. 9, 2018. English translation provided.
Notice of Allowance issued in U.S. Appl. No. 15/110,828 dated Jan. 23, 2018.

* cited by examiner

MUSICAL-PERFORMANCE-INFORMATION TRANSMISSION METHOD AND MUSICAL-PERFORMANCE-INFORMATION TRANSMISSION SYSTEM

TECHNICAL FIELD

The present invention relates to a musical-performance-information transmission method and a musical-performance-information transmission system.

Priority is claimed on Japanese Patent Application No. 2014-3695, filed Jan. 10, 2014, the content of which is incorporated herein by reference.

BACKGROUND ART

A method of performing a remote lesson using player pianos has been proposed. In this type of method, a controller that is connected to a player piano on the transmission side and a controller that is connected to a player piano on the reception side are connected via a network. When a model musical performance is performed by an instructor on the player piano on the transmission side, that model musical performance is reproduced on the player piano on the reception side. Specifically, when musical-performance data in the MIDI (Musical Instrument Digital Interface) format, which represents played sounds, is generated in accordance with the playing of the instructor, the generated musical-performance data is transmitted from the controller on the transmission side to the controller on the reception side. The reception-side controller outputs that musical-performance data to the player piano. The player piano, based on that musical-performance data, generates sounds by the string-striking of hammers and performs automatic playing. Also, the instructor, while performing the model musical performance with the player piano, provides guidance by voice as necessary. The voice of the instructor is picked up by a microphone connected to the transmission-side controller, transmitted to the reception-side controller via the aforementioned network, and emitted from a speaker that is connected to the controller. Thereby, the practicing person, while hearing the model musical performance, can receive instruction by the voice of the instructor.

Adjustments are made to the orientation, frequency characteristics, and sensitivity of the microphone on the transmission side so as to be suited to picking up the instructor's voice. However, despite that the played sounds being emitted from the player piano can end up being picked up during the model musical performance of the instructor. For that reason, on the reception side, the played sounds based on the musical-performance data that has been transmitted and the played sounds that have been picked up by the microphone on the transmission side and transmitted to the reception side are both played back. When there is a shift in the playback timing of the played sounds based on the musical-performance data output from the player piano and the played sounds picked up by the microphone, a problem occurs of it being extremely hard to hear for the practicing person on the reception side. To solve this problem, a method has been proposed in Patent Document 1 of shutting off the communication path of sounds picked up by the transmission-side microphone when the instructor is playing the piano.

PRIOR ART DOCUMENTS

Patent Document

[Patent Document 1] Japanese Unexamined Patent Application, First Publication No. 2008-172409

DISCLOSURE OF THE INVENTION

Problems to be Solved by the Invention

However, with the method described above, when the instructor is playing the player piano, while the sounds of the piano being picked up by the microphone are no longer transmitted to the reception side, the vocal sounds being made during playing for instruction are also no longer transmitted to the reception side (practicing person). Therefore, there are times that the instructor, while performing, cannot give instruction by speech.

The present invention was achieved in view of these circumstances, and its purpose to provide a musical-performance-information transmission method and a musical-performance-information transmission system that, while transmitting the content uttered during a musical performance at one side to another side, can reduce the difficulty in hearing played sounds at the other side.

Means for Solving the Problems

One aspect of the present invention is a musical-performance-information transmission method using a first musical instrument that produces sounds in accordance with a user's playing and generates musical-performance data in accordance with the produced sounds, and a second musical instrument that produces sounds by receiving the musical-performance data via a communication means, the method including: generating a mixed-sound signal in accordance with sounds in which are mixed sounds produced from the first musical instrument and sounds that differ from the sounds produced from the first musical instrument, generating a reference signal in accordance with the sounds produced from the first musical instrument, generating a separation signal by removing the reference signal from the mixed-sound signal, and emitting sounds based on the separation signal.

Also, one aspect of the present invention is a musical-performance-information transmission method using a first system having a first musical instrument that produces sounds in accordance with a user's playing and generates musical-performance data in accordance with the produced sounds, and a second system having a second musical instrument that produces sounds based on the musical-performance data, the method including: in the first system, generating as a mixed-sound signal sounds in which are mixed sounds produced from the first musical instrument and sounds that differ from the sounds produced from the first musical instrument; generating a reference signal in accordance with the sounds produced from the first musical instrument; generating a separation signal by removing the reference signal from the mixed-sound signal; and transmitting the separation signal to the second system.

Also, one aspect of the present invention is a musical-performance-information transmission method using a first system having a first musical instrument that produces sounds in accordance with a user's playing and generates musical-performance data in accordance with the produced sounds, and a second system having a second musical instrument that produces sounds based on the musical-performance data, the method including: in the second system, receiving a separation signal in which a reference signal in accordance with sounds produced by the first musical instrument has been removed from a mixed-sound signal in accordance with sounds in which are mixed sounds produced from the first musical instrument and sounds that differ from the sounds produced from the first musical instrument; and emitting sounds based on the separation signal.

Also, one aspect of the present invention is a musical-performance-information transmission system using a first musical instrument that produces sounds in accordance with a user's playing and generates musical-performance data in accordance with the produced sounds, and a second musical instrument that produces sounds by receiving the musical-performance data via a communication means, the system including a vocal sound signal collecting device that generates a mixed-sound signal in accordance with sounds in which are mixed sounds produced from the first musical instrument and sounds that differ from the sounds produced from the first musical instrument; a sound-source that generates a reference signal in accordance with the sounds produced from the first musical instrument; a signal processor that generates a separation signal by removing the reference signal from the mixed-sound signal; and a sound-emitter that emits sounds based on the separation signal.

Effects of the Invention

As described above, according to the present invention, it is possible while transmitting the content uttered during a musical performance at one side to another side, to reduce the difficulty in hearing played sounds at the other side.

EMBODIMENTS FOR CARRYING OUT THE INVENTION

Figure 1:
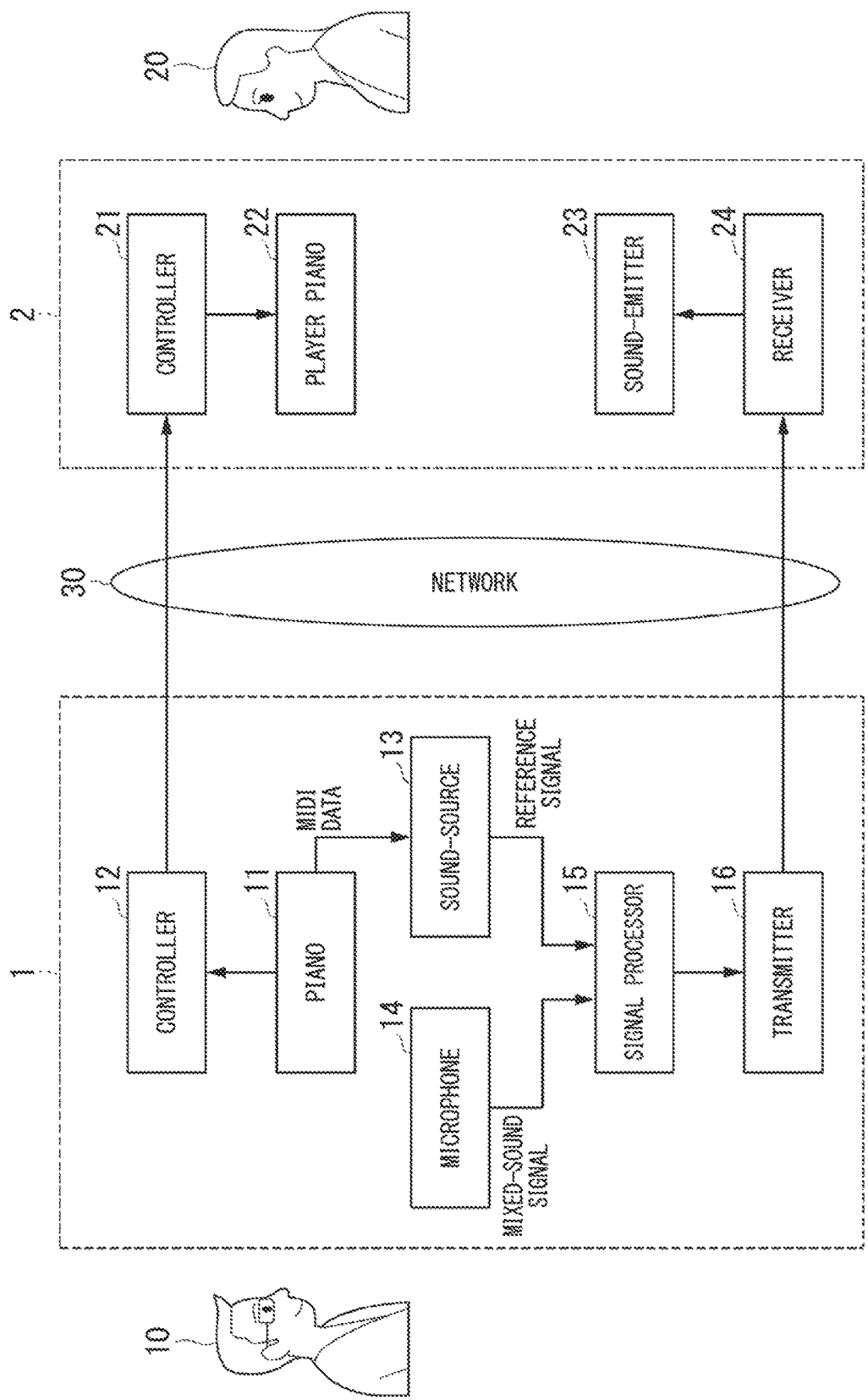
FIG. 1 is a block diagram that shows the musical-performance-information transmission system according to the first embodiment of the present invention.

Hereinbelow, the musical-performance-information transmission system in the present embodiment will be described referring to the drawings.

First Embodiment

FIG. 1 is a block diagram of the musical-performance-information transmission system in the first embodiment. As shown in FIG. 1, this musical-performance-information transmission system is provided with System 1 (a first system) and System 2 (a second system). System 1 and System 2 are respectively connected by a network 30 such as the Internet or a LAN (Local Area Network). This network 30 may be wired such as a communication cable, may be wireless, and may be a combination of both wired and wireless.

System 1 is provided with a piano 11, a controller 12, a sound-source 13, a microphone 14, a signal processor 15, and a transmitter 16. System 1 is used for example by an instructor 10 instructing a musical performance. System 2 is provided with a player piano 22, a controller 21, a sound-emitter 23, and a receiver 24. System 2 is used for example by a practicing person 20 practicing a musical performance while receiving the instruction of the instructor 10.

The piano 11 (first musical instrument), in accordance with the musical performance of the instructor 10, generates musical-performance data that represent the played sounds. The musical-performance data is for example data in the MIDI format (musical-performance data for an electronic instrument). The piano 11 supplies the generated musical-performance data to the controller 12 and the sound-source 13.

The controller 12 is a communication device that transmits musical-performance data. The controller 12 converts the musical-performance data supplied from the piano 11 to data suited to the communication protocol of the network 30. Also, the controller 12 transmits the converted data via the network 30 to the controller 21.

The sound-source 13 is for example an electronic sound source. The sound-source 13 transmits musical sound waveforms of a piano timbre in accordance with the pitches designated by the musical-performance data obtained from the piano 11 to the signal processor 15 as a reference signal.

The microphone (vocal sound signal collecting device) 14 picks up the vocal sounds, and outputs a signal representing the picked-up vocal sounds to the signal processor 15. The orientation, frequency characteristics, and sensitivity of the microphone 14 are adjusted on the assumption of for example performing sound collection in the vicinity of the mouth of the instructor 10. However, in the case of the instructor 10 performing instruction orally to the practicing person 20 while playing the piano 11, the microphone 14, in addition to the vocal sounds emitted from the mouth of the instructor 10 (hereinbelow referred to as the "vocal sounds"), also picks up the played sounds generated by the string striking of the hammers provided in the piano 11 (herinbelow referred to as "played sounds"). The microphone 14 picks up sounds in which the vocal sounds of the instructor 10 and the played sounds of the piano 11 are mixed (hereinbelow referred to as a "mixed sounds"). Thereby, the microphone 14 outputs the mixed sounds in which the vocal sounds and the played sounds are mixed to the signal processor 15 as a mixed-sound signal.

The signal processor 15 is connected with the sound-source 13 and the microphone 14. This signal processor 15 is for example mounted with the transmitter 16 in a personal computer (PC).

The signal processor 15 obtains a reference signal from the sound-source 13. Also, the signal processor 15 obtains the mixed-sound signal from the microphone 14. The signal processor 15, based on the obtained reference signal and mixed-sound signal, separates the mixed-sound signal into a signal representing the vocal sounds and a signal representing the played sounds. Specifically, the signal processor 15, using the mixed-sound signal and the reference signal, separates the signal that represents the vocal sounds by removing the reference signal in accordance with the played sounds of the piano 11 from the mixed-sound signal.

A method of separating the mixed sounds in which these two sounds are mixed into individual sounds can for example use semi-blind source separation technology. In semi-blind source separation technology, any one of a plurality of sounds that are mixed in a mixed-sound signal is input to the signal processor 15 as a reference (reference signal). In the present embodiment, it is possible to use electronic sounds (musical waveforms) as the reference signal for separating the signal representing the vocal sounds from the mixed-sound signal including the signal representing the played sounds and the signal representing the vocal sounds. That is, the signal processor 15, by using the electronic sounds, can cancel the signal representing the played sounds of the mixed sounds and extract only the signal representing the vocal sounds of the instructor.

The signal processor 15 outputs the signal representing the vocal sounds obtained by separating the mixed-sound signal to the transmitter 16 as a separation signal.

The transmitter 16 converts the separation signal to digital sound data, and transmits the converted sound data to the receiver 24 of System 2 via the network 30.

Note that in the case of the piano 11 serving as the player piano, since the piano 11 is provided with the controller 12 and the sound-source 13, it may utilize them. Also, the piano 11 may be integrally provided not only with the controller 12 and the sound-source 13 but also all or some of the microphone 14, the signal processor 15, and the transmitter 16.

The controller 21 is a communication device that receives musical-performance data. The controller 21 converts the musical-performance data received via the network 30 to a format that the player piano 22 can interpret. Also, the controller 21 supplies the converted musical-performance data to the player piano 22.

The player piano 22 (second musical instrument) is a piano that has an automatic playing function, and performs automatic playing based on the musical-performance data transmitted from the controller 21. Note that this automatic playing is performed by the player piano 22 controlling a solenoid for key driving based on the musical-performance data and generating piano sounds by string striking, but since that technology is publicly known, a detailed description is omitted.

The receiver 24 performs D/A conversion of the digital sound data received from the transmitter 16 to an analog sound signal and supplies it to the sound-emitter 23.

The sound-emitter 23 emits sound in accordance with the analog sound signal supplied from the receiver 24. The sound-emitter is for example a speaker.

Note that the player piano 22 may be integrally provided with all or some of the controller 21, the sound-emitter 23, and the receiver 24.

Figure 2:
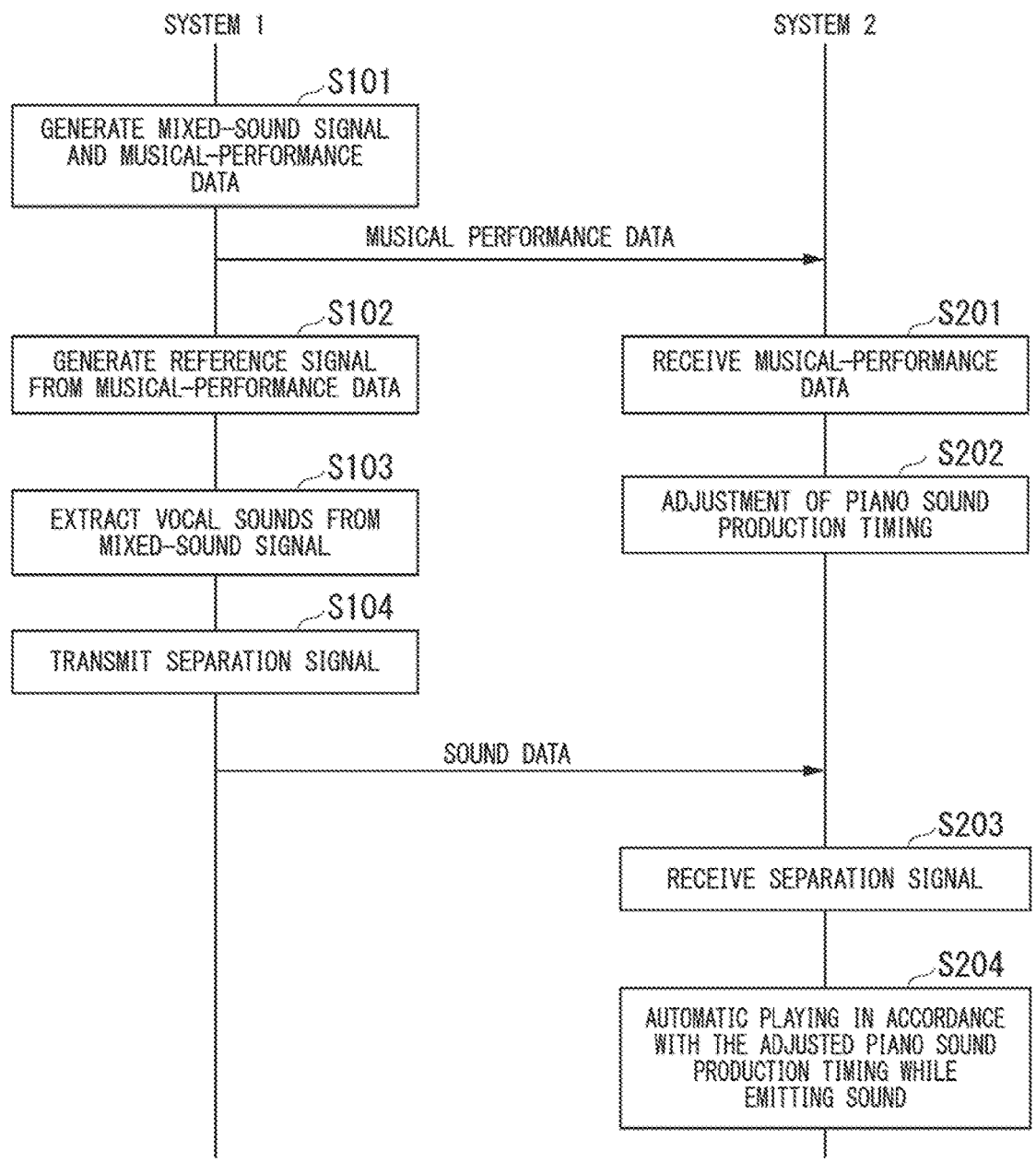
FIG. 2 is a sequence diagram that describes the operation of the first embodiment.

Next, using FIG. 2, a description will be given for the operation of System 1 extracting the signal representing the vocal sounds of the instructor 10 from the mixed-sound signal, to sound emission by System 2 based on the extracted signal representing the vocal sounds. FIG. 2 is a sequence diagram that describes an operation example in the present embodiment.

The instructor 10, while performing by playing the piano 11 in accordance with the song that is the object of instruction, performs instruction orally to the practicing person 20 via the microphone 14.

In Step S101, the piano 11 generates musical-performance data in accordance with the musical performance of the instructor 10. The piano 11 transmits the generated musical-performance data to the controller 12 and the sound-source 13. The controller 12 outputs the musical-performance data to the controller 21 via the network 30. Also, the microphone 14 picks up the mixed sounds of the vocal sounds of the instructor 10 and the played sounds of the piano 11. Then, the microphone 14 supplies the picked-up mixed sounds as the mixed-sound signal to the signal processor 15.

In Step S102, the sound-source 13 generates musical piece waveforms (sounds of a piano timbre in accordance with the designated pitches) based on the musical-performance data obtained from the piano 11. The sound-source 13 transmits the reference signal in accordance with the musical piece waveforms to the signal processor 15.

In Step S103, the signal processor 15 obtains the reference signal of the piano 11 from the sound-source 13. Also, the signal processor 15 obtains the mixed-sound signal from the microphone 14.

The signal processor 15 separates the mixed-sound signal into a signal representing the vocal sounds of the instructor 10 and a signal representing the played sounds of the piano 11. That is, the signal processor 15 uses the reference signal to cancel the played sounds of the piano contained in the mixed-sound signal. Thereby, the signal processor 15 extracts only the signal representing the vocal sounds from the mixed-sound signal. The signal processor 15 outputs the extracted signal representing the vocal sounds of the instructor as a separation signal to the transmitter 16.

In Step S104, the transmitter 16 converts the separation signal to digital sound data, and transmits the sound data of that separation signal to the receiver 24 of System 2 via the network 30.

In Step S201, the controller 21 receives the musical-performance data received via the network 30. The controller 21 supplies the received musical-performance data to the player piano 22.

In Step S202, the player piano 22 receives the musical-performance data, and adjusts the timing at which it performs automatic playing (piano sound production timing). The adjustment of this timing is performed using a value that the user has set in advance (for example, wait time) so as to become the same timing as the sound emission of Step S204 described below.

In Step S203, the receiver 24 performs D/A conversion of the sound data of the received separation signal into an analog sound signal and outputs it to the sound-emitter 23.

In Step S204, the sound-emitter 23 emits sound in accordance with the analog sound signal supplied from the receiver 24. Also, the player piano 22 performs an automatic playing at the adjusted piano sound production timing based on the musical-performance data supplied from the controller 21.

As described above, according to the present embodiment, in the musical-performance-information transmission method that performs a remote lesson using a player piano, System 1 transmits musical-performance data that is generated when the instructor 10 plays the piano 11 to the player piano 22 via the network 30. Thereby, the player piano 22 performs automatic playing by string striking based on the received musical-performance data. Thereby, the practicing person 20 can hear by the player piano 22 the musical performance of the instructor 10 (including the way of playing the keyboard and the way of using the pedals).

Also, the system 1 extracts only the vocal sounds of the instructor 10 from the mixed sounds of the vocal sounds of the instructor 10 and the played sounds picked up by the microphone 14, with the musical sound waveforms of a piano timbre generated from the musical-performance data serving as a reference signal. System 1 transmits the extracted vocal sounds as a separation signal to System 2. System 2 emits the received separation signal by the sound-emitter 23 such as a speaker. Thus, the vocal sounds of the instructor 10 is emitted by decreasing the played sounds. Thereby, the practicing person 20 can hear the playing of the piano 11 of the instructor 10 by the player piano 22 of the practicing person striking strings, and can hear from the sound-emitter 23 the vocal sounds of the instructor 10 in the state of the played sounds being decreased. Meanwhile, the instructor 10 can perform instruction by voice to the practicing person 20 while playing the piano 11.

In this way, in the musical-performance-information transmission method of the present embodiment, even when the played sounds and the vocal sounds of the instructor 10 are picked up by the microphone 14, it is possible to emit from the sound-emitter 23 the vocal sounds of the instructor 10 by cancelling the played sounds included in the mixed sounds. Thereby, it is possible to ensure that both the played sounds that are picked up by the microphone 14 and the played sounds of the piano 11 that are transmitted via the controller 12 are not played back in System 2.

Also, according to the present embodiment, when the instructor 10 is playing the piano 11, it is possible to prevent the played sounds of the piano from being mixed in with the sounds being emitted from the sound-emitter 23, without shutting off the communication path of the vocal sounds picked up by the microphone 14.

Hereinabove, the embodiment of the present invention was described in detail while referring to the drawings, but specific constitutions are not limited to this embodiment, and designs within a range that does not depart from the gist of the present invention are included.

In the embodiment described above, the description was given with the example having as its purpose a remote lesson of a player piano, but the object for applying the present invention is not limited thereto. For example, two performers giving a performance on an equal basis, and not the basis of for example "instruction" and "practicing," may utilize this system. The second embodiment and the third embodiment are shown below.

Second Embodiment

In the first embodiment, the piano 11 may be further provided with the function of the player piano 22, the controller 12 may be further provided with the function of the controller 21, the controller 21 may be further provided with the function of the controller 12, and the player piano 22 may be further provided with the function of the piano 11. In this case, System 1 can not only cancel the played sounds of the instructor 10 that are picked up by the microphone 14, but can also cancel played sounds of the piano 11 that are played by the musical-performance data transmitted via the network 30 from the player piano 22 of System 2, so-called "played sounds of the practicing person 20 at the piano 11." Hereinbelow, the case of System 1 cancelling the played sounds of the practicing person 20 will be described.

In the musical-performance-information transmission method of the present embodiment, the controller 21 transmits to the controller 12 via the network 30 the musical-performance data when the practicing person 20 plays the player piano 22. The controller 12 simultaneously transmits this musical-performance data to the piano 11 and the sound-source 13. The sound-source 13 generates musical sound waveforms of a piano timbre based on the musical-performance data of the practicing person 20, and transmits this as a reference signal to the signal processor 15. Meanwhile, the piano 11 performs automatic playing by the musical performance of the practicing person 20 based on the received musical-performance data. The played sounds at this time are picked up by the microphone 14, and transmitted to the signal processor 15 as a mixed-sound signal.

By the signal processor 15 receiving the mixed-sound signal from the microphone 14 and the reference signal from the sound-source 13, cancelling the played sounds becomes possible. That is, during the automatic playing of the piano 11 by the playing of the practicing person 20, even if the microphone 14 picks up mixed sounds of played sounds and vocal sounds due to the instructor emitting vocal sounds from the mouth (making utterances), the signal processor 15 can cancel only the played sounds and extract only the vocal sounds of the instructor 10. The extracted vocal sounds are transmitted from the transmitter 16 to the receiver 24 via the network 30, and emitted from the sound-emitter 23. Thereby, the practicing person 20 can clearly hear from the sound-emitter 23 the vocal sounds of the instructor 10 that was produced during his own playing.

Third Embodiment

Figure 3:
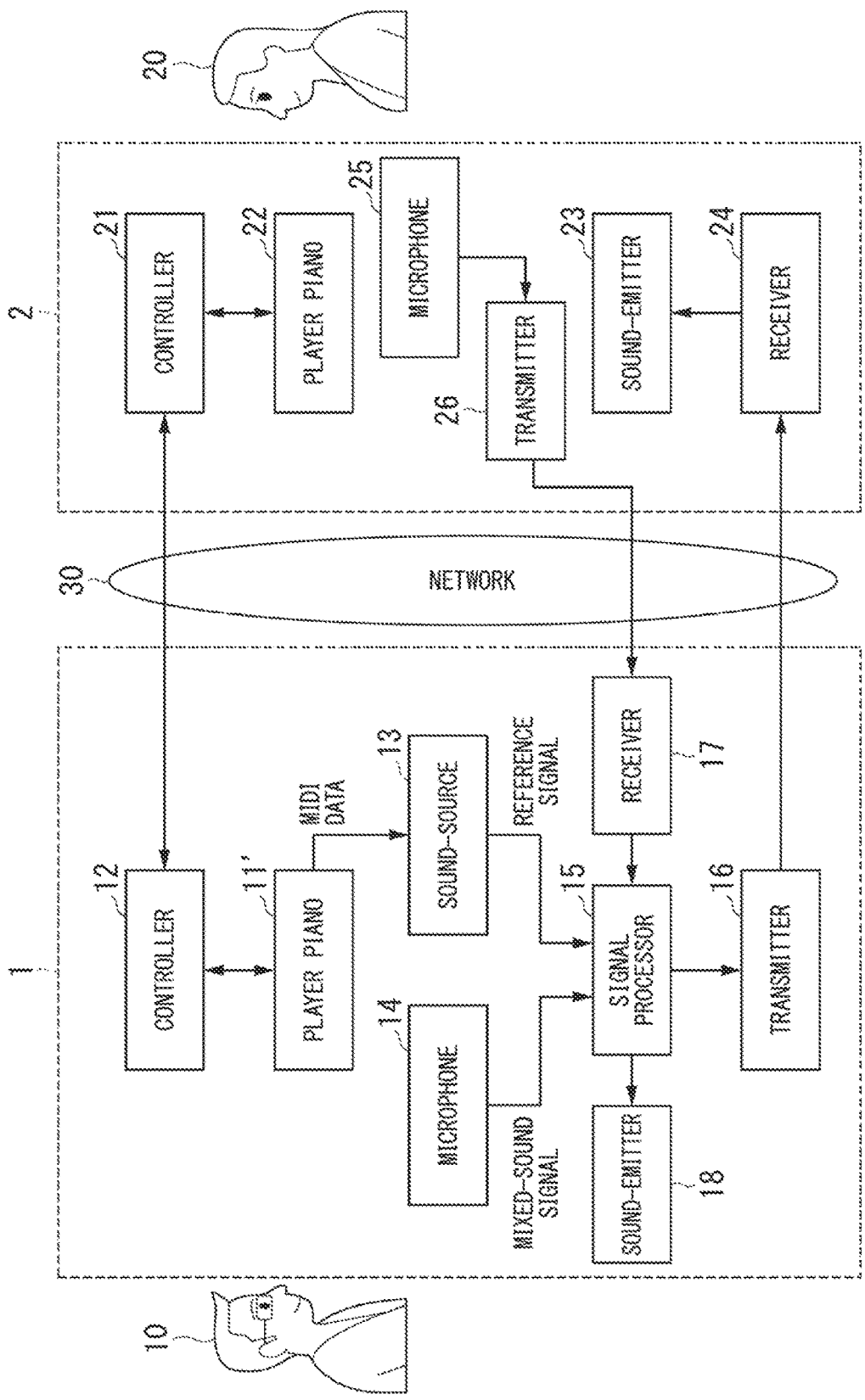
FIG. 3 is a block diagram that shows the musical-performance-information transmission system according to the third embodiment of the present invention.

As shown in FIG. 3, in the third embodiment, in addition to the second embodiment, System 2 is provided with a microphone 25 and a transmitter 26 that transmits the sounds signal picked up by the microphone 25. Also, System 2 is provided with a receiver 17 that receives the sound signal picked up by the microphone 25 and supplies that sound signal to the signal processor 15. In this case, in System 1, the signal processor 15, similarly to the second embodiment, cancels the played sounds of a player piano 11' picked up by the microphone 14. Moreover, the signal processor 15 is capable of cancelling the played sounds of the practicing person 20 from the mixed sounds of speech content of the practicing person 20 picked up via the microphone 25 and the played sounds of the practicing person 20. Hereinbelow, the operation of System 1 cancelling the played sounds of the practicing person 20 will be described.

In the musical-performance-information transmission method of the present embodiment, the musical-performance data when the practicing person 20 plays the player piano 22 is sent to the controller 21, and sent to the controller of System 1 via the network 30. This musical-performance data is supplied to the player piano 11' to be performed by the player piano 11', and also transmitted to the sound-source 13. System 2 transmits the mixed sounds picked up by the microphone 25 in the vicinity of the player piano 22 of the practicing person 20 as a mixed-sound signal to the signal processor 15 of System 1 via the transmitter 26 and the receiver 17. Here, the mixed sounds are sounds in which are mixed the vocal sounds of the practicing person 20 and the played sounds generated by the practicing person 20 playing the player piano 22.

The sound-source 13 transmits musical sound waveforms of a piano timbre in accordance with the pitches designated by the musical-performance data generated by the player piano 22 to the signal processor 15.

The signal processor 15, using the reference signal, cancels the played sounds of the player piano 22 included in the mixed-sound signal, and extracts the vocal sounds of the practicing person 20. The signal processor 15 emits the extracted vocal sounds of the practicing person 20 (separation signal) by a sound-emitter 18 such as a speaker of System 1.

Note that the embodiments described above may be modified as follows.

The embodiments described above can be applied to systems constituted by various numbers of persons, in which the instructor and practicing person are not one to one, but one to many, many to one, many to many, and the like. Also, it can be applied to one having as its object for example a remote concert or the like.

Figure 4:
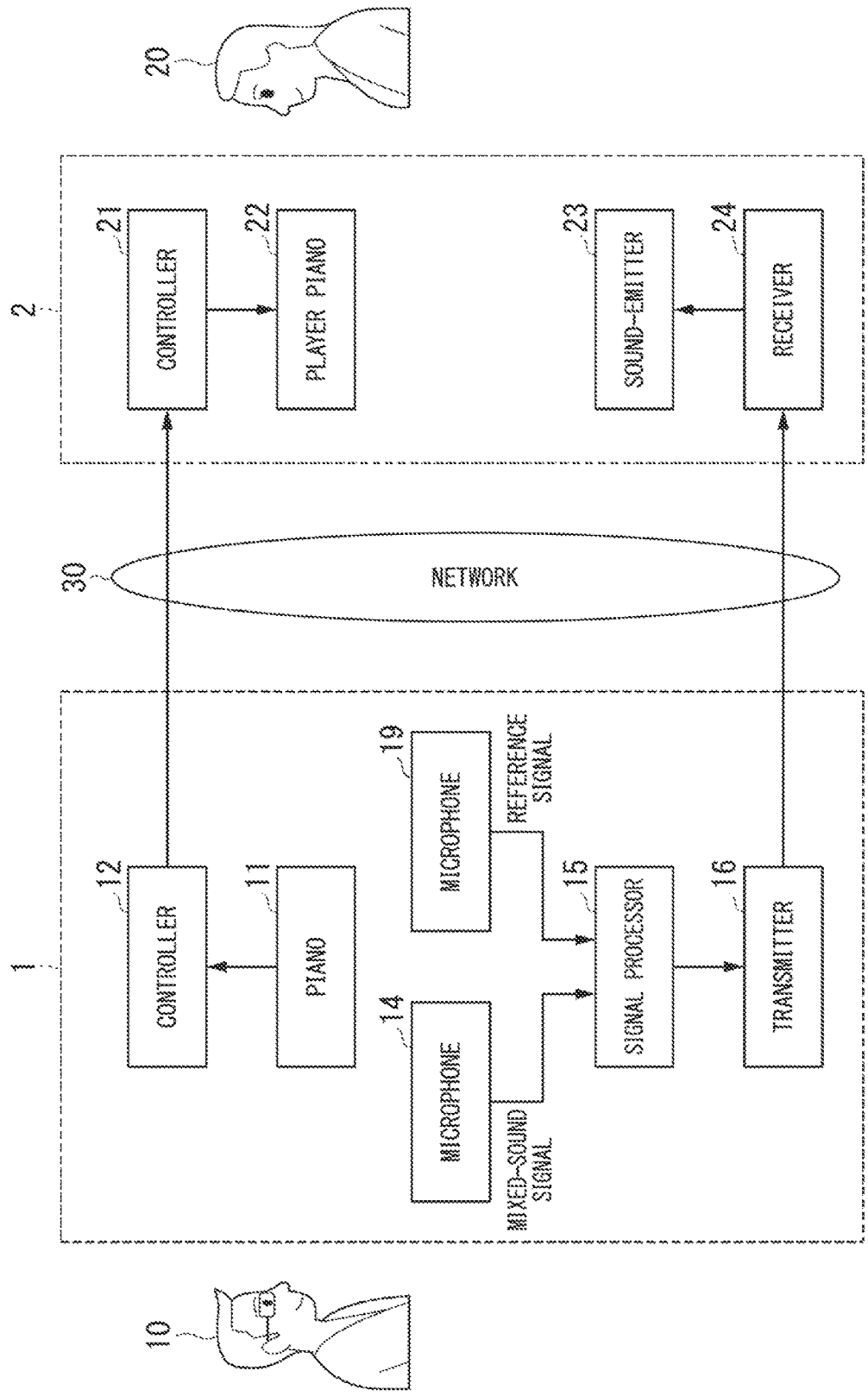
FIG. 4 is a block diagram that shows the musical-performance-information transmission system according to a modification of the embodiment of the present invention.

Also, in the embodiment described above, the sound-source 13 transmits to the signal processor 15 as a reference signal musical sound waveforms of a piano timbre generated from the musical-performance data transmitted from the piano 11 or player piano 22. Instead of this, as shown in FIG. 4, a microphone 19 for reference signal generation may be provided in the vicinity of the piano 11, and the played sounds of the piano 11 that the microphone 19 has picked up may be transmitted to the signal processor 15 as the reference signal. It is desirable that the microphone 19 have narrow directionality and have a sound pick-up characteristic specialized for the played sounds of the piano 11. Also, the microphone 19 is arranged at a position that has less of a tendency to pick up the vocal sounds uttered by the instructor 10.

Note that instead of the microphone 19 described above, physical quantity sensors such as a piezo sensor, acceleration sensor, and velocity sensor may be provided in the piano 11, and the signals obtained from these sensors may be transmitted to the signal processor 15 as reference signals. In this case, the physical quantity sensors are preferably attached to the bridge or soundboard, which are locations where vibrations are produced by the string striking of the piano 11.

Also, in the embodiment described above, the signal processor 15 was provided in System 1, but the present invention is not limited thereto. For example, the signal processor 15 may be mounted in a server on the network 30 or in System 2. In this case, System 1 transmits the mixed-sound signal and the reference signal to System 2 via the network 30 or the server on the network 30. In this case, the reference signal may be generated from the musical-performance data of the controller 21 or the player piano 22 of System 2.

Also, in the embodiment described above, descriptions were given for the case of using the piano 11 as the first musical instrument and the player piano 22 as the second musical instrument, but provided the first musical instrument and the second musical instrument are the same type of musical instrument and the second musical instrument is a musical instrument having an automatic performance function, they may be other musical instruments. In this case, the sound-emitter 13 should transmit musical sound waveforms with the timbre of that musical instrument as the reference signal to the signal processor 15.

Hereinabove, embodiments of the present invention were described referring to the drawings, but it is evident that the embodiments are merely illustrative examples of the present invention and the present invention is not limited to the aforementioned embodiments. Accordingly, additions, omissions, replacements, and other modifications of the constituent elements may be performed within a range that does not depart from the scope of the claims of the present invention.

DESCRIPTION OF THE REFERENCE SYMBOLS 1, 2: System
10: Instructor
11: Piano
11', 22: Player piano
12, 21: Controller
13: Sound-source
14: Microphone
15: Signal processor
16: Transmitter
17: Receiver
18: Sound-emitter
20: Practicing person
23: Sound-emitter
24: Receiver
25: Microphone
26: Transmitter

The invention claimed is:

1. A musical-performance-information transmission method using a first musical instrument that produces sounds in accordance with a user's playing and generates musical-performance data in accordance with the produced sounds, and a second musical instrument that produces sounds by receiving the musical-performance data via a network, the method comprising the steps of:
   generating a mixed-sound signal from played sounds of the first musical instrument and other sounds picked up by a microphone;
   generating a reference signal with a sound-source based on performance data generated by the first musical instrument;
   generating a separation signal by removing the played sounds picked up by the microphone from the mixed-sound signal using the reference signal;
   transmitting the separation signal to the second musical instrument; and
   emitting sounds by the second musical instrument based on the separation signal received from the first musical instrument.

2. The musical-performance-information transmission method according to claim 1, wherein the reference signal is a musical sound waveform in accordance with a pitch specified by the musical-performance data that the first musical instrument generates.

3. The musical-performance-information transmission method according to claim 1, wherein the microphone is arranged in the vicinity of the first musical instrument.

4. The musical-performance-information transmission method according to claim 1, wherein the other sounds are vocal sounds that the user playing the first musical instrument generates.

5. The musical-performance-information transmission method according to claim 1, wherein the first musical instrument includes the sound-source.

6. A musical-performance-information transmission method using a first system having a first musical instrument that produces sounds in accordance with a user's playing and generates musical-performance data in accordance with the produced sounds, and a second system having a second musical instrument that produces sounds by receiving the musical-performance data via a network, the method comprising the steps of:
   in the first system:
      generating a mixed-sound signal from played sounds of the first musical instrument and other sounds picked up by a microphone;
      generating a reference signal with a sound-source based on performance data generated by the first musical instrument;
      generating a separation signal by removing the played sounds picked by the microphone from the mixed-sound signal using the reference signal; and
      transmitting the separation signal to the second system.

7. The musical-performance-information transmission method according to claim 6, wherein the reference signal is a musical sound waveform in accordance with a pitch specified by the musical-performance data that the first musical instrument generates.

8. The musical-performance-information transmission method according to claim 6, wherein microphone is arranged in the vicinity of the first musical instrument.

9. The musical-performance-information transmission method according to claim 6, wherein the other sounds are vocal sounds that the user playing the first musical instrument generates.

10. The musical-performance-information transmission method according to claim 6, further comprising the steps of:
in the second system:
receiving the separation signal from the first system; and
emitting sounds based on the separation signal received from the first system.

11. The musical-performance-information transmission method according to claim 10, wherein the reference signal is a musical sound waveform in accordance with a pitch specified by the musical-performance data that the first musical instrument generates.

12. The musical-performance-information transmission method according to claim 10, wherein microphone is arranged in the vicinity of the first musical instrument.

13. The musical-performance-information transmission method according to claim 10, wherein the other sounds are vocal sounds that the user playing the first musical instrument generates.

14. A musical-performance-information transmission system comprising:
a first musical instrument that produces sounds in accordance with a user's playing and generates musical-performance data in accordance with the produced sounds; and
a second musical instrument that produces sounds by receiving the musical-performance data via a network,
wherein the first musical instrument includes:
a sound collecting device that generates a mixed-sound signal from played sounds of the first musical instrument and other sounds picked up by said sound collecting device;
a sound-source that generates a reference signal based on performance data generated by the first musical instrument;
a signal processor that generates a separation signal by removing the played sounds pickup by the sound collecting device using the reference signal; and
a transmitter that transmits the separation signal to the second musical instrument, and
wherein the second musical instrument includes a sound-emitter that emits sounds based on the separation signal received from the first musical instrument.

15. The musical-performance-information transmission system according to claim 14, wherein the reference signal is a musical sound waveform in accordance with a pitch specified by the musical-performance data that the first musical instrument generates.

16. The musical-performance-information transmission system according to claim 14, wherein the sound collecting device is a microphone arranged in the vicinity of the first musical instrument.

17. The musical-performance-information transmission method according to claim 14, wherein the other sounds are vocal sounds that the user playing the first musical instrument generates.

* * * * *